United States Patent
Pedersen et al.

(10) Patent No.: US 9,845,906 B2
(45) Date of Patent: Dec. 19, 2017

(54) RELEASE CLIP

(75) Inventors: Egil Pedersen, Raufoss (NO); Kristoffer Dale, Lillehammer (NO); Henning Rud, Gaupen (NO); Jan E. Sangro, Hamar (NO)

(73) Assignee: Kongsberg Automotive AS, Kongsberg (NO)

( * ) Notice: Subject to any disclaimer, the term of this patent is extended or adjusted under 35 U.S.C. 154(b) by 1420 days.

(21) Appl. No.: 11/912,181

(22) PCT Filed: Apr. 20, 2006

(86) PCT No.: PCT/NO2006/000145
§ 371 (c)(1),
(2), (4) Date: Aug. 21, 2008

(87) PCT Pub. No.: WO2006/112727
PCT Pub. Date: Oct. 26, 2006

(65) Prior Publication Data
US 2008/0309079 A1  Dec. 18, 2008

(30) Foreign Application Priority Data

Apr. 20, 2005 (NO) .................................. 20051920

(51) Int. Cl.
*F16L 37/098* (2006.01)
*F16L 37/092* (2006.01)

(52) U.S. Cl.
CPC ....... *F16L 37/0982* (2013.01); *F16L 37/0925* (2013.01)

(58) Field of Classification Search
CPC ..... F16L 37/00; F16L 37/088; F16L 37/0982; F16L 2201/80; F16L 37/0925; F16L 37/0915

USPC .......................... 285/39, 308, 321, 400, 314
See application file for complete search history.

(56) References Cited

U.S. PATENT DOCUMENTS

| 4,126,335 | A | * | 11/1978 | Voss ................................ 285/39 |
| 4,927,185 | A | * | 5/1990 | McNaughton ................... 285/39 |
| 5,226,230 | A | * | 7/1993 | Klinger ........................... 29/237 |
| 5,301,408 | A | * | 4/1994 | Berman et al. ................. 29/237 |
| 5,328,215 | A | | 7/1994 | Grenier |
| 5,533,761 | A | * | 7/1996 | Ostrander et al. .............. 285/38 |

(Continued)

FOREIGN PATENT DOCUMENTS

| EP | 0588596 | 3/1994 |
| EP | 1020677 | 7/2000 |
| WO | WO2005/114031 A2 * | 12/2005 |

*Primary Examiner* — Gregory J Binda
*Assistant Examiner* — Zachary T Dragicevich
(74) *Attorney, Agent, or Firm* — Mintz Levin Cohn Ferris Glovsky and Popeo, P.C.; Steven M. Jensen

(57) ABSTRACT

A release clip for a tube connector is provided for use in a system with flowing fluid. The tube connector includes a housing with an opening through which the flowing fluid passes, and is arranged for secure and sealing connection with a tube which is inserted in the connector. In the housing there is mounted a circular gripper ring which grips the tube. The release clip has a tubular circular release body which is split along its longitudinal axis and includes an integral hinge, thus enabling it to be mounted around the tube that has to be released and the length of the release body in its longitudinal direction is at least equal to the distance extending from the housing's opening to the gripper ring.

12 Claims, 4 Drawing Sheets

(56) References Cited

U.S. PATENT DOCUMENTS

| | | |
|---|---|---|
| 6,557,903 B2 * | 5/2003 | Walker .......................... 285/305 |
| 6,676,171 B2 * | 1/2004 | Bucher et al. ................ 285/319 |
| 7,316,428 B2 * | 1/2008 | Takayanagi et al. ......... 285/319 |
| 2006/0042063 A1 * | 3/2006 | Tally et al. .................... 29/237 |
| 2006/0049630 A1 * | 3/2006 | Bilstein et al. ............... 285/321 |

* cited by examiner

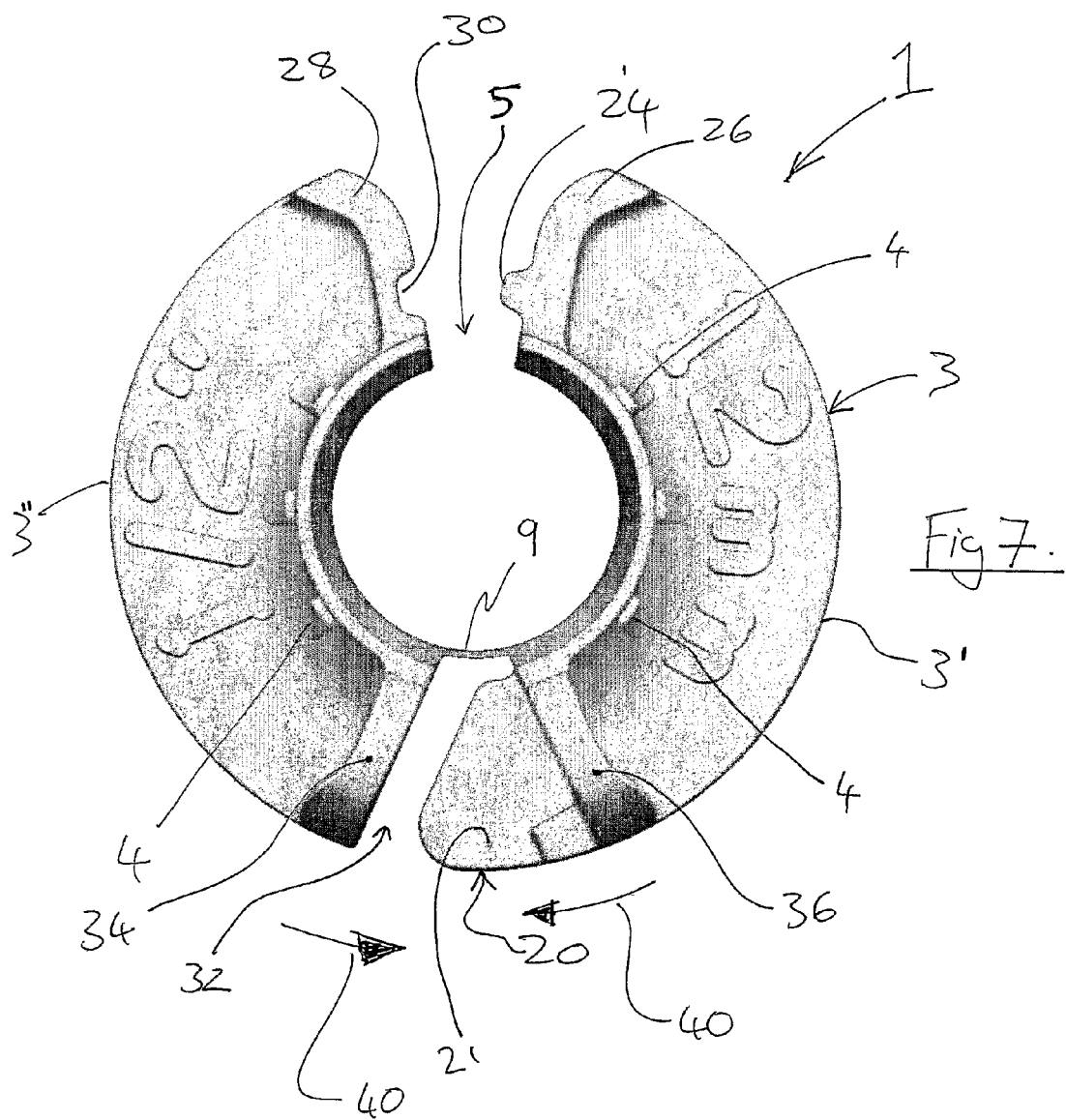

RELEASE CLIP

A release clip is provided for releasing a tube from a tube connector. The release clip is provided as a shoulder around the tube that has to be released and is pushed into the connector on the outside of the tube.

BACKGROUND OF THE INVENTION

With regard to tube connectors, particularly quick release connectors of the push-in type, it may often be desirable to release a tube after it has been mounted in the tube connector. This may be due to a number of different factors, such as the desire to replace a tube on account of mechanical damage or leakage, or as a part of the task of dismantling for alteration or due to faulty assembly.

From the prior art a variety of release devices and releasing tools for tube connectors are known from German utility patent DE 201 06 713, as well as the patent publications U.S. Pat. No. 5,752,726, DE 69115231 and JP 03264272.

In DE 201 06 713 a tool is disclosed that is pushed into a tube connector where the tube is secured by a locking ring. This known tool is based on a locking ring being pulled far enough out of engagement with the tube to enable the tube to be released. In the present invention the release clip pushes a locking ring along conical surfaces in the housing and the locking ring is split along its circumference so that, on account of its inherent elasticity, it expands when pushed along the conical surfaces, thereby losing its gripping force and clamping force round the tube. The tube can therefore be released and withdrawn.

A release clip for a tube connector should be easy to mount and for several reasons it should be a separate part from the connector. This prevents the connector from being inadvertently released, which may occur in the case of an integrated release device. Moreover, this makes the actual connector less expensive to produce since it then consists of fewer parts. In addition, the release clip should be designed so that it does not damage or compromise the connector (or the tube) during use. It should also be easy to use. It is also an object that it should be able to be employed manually, without the use of associated tools.

DISCLOSURE OF THE INVENTION

According to a first aspect of the present invention there is provided a release clip adapted for releasing an end part of a tubular element from being secured within a connector element, the release clip comprising a tubular body, characterized in that, the tubular body is formed with a single split extending along the longitudinal axis of the body and the tubular body comprising an integral hinge formed by a region of tubular body, whereby the release clip is mountable onto the tubular element and demountable from the tubular element.

The integral hinge is preferably at lease partly formed by a region of reduced wall thickness of the tubular body and the integral hinge is also disposed substantially opposite the split. This arrangement provides a compact device that can be used in a confined space. The release clip is preferably made from a plastic material and the integral hinge region has a degree of flexibility that allows the release clip to be mounted onto a tubular element and demounted from a tubular element. The release clip may be formed as a single unit by injection molding or any other manufacturing method suitable for a plastic material.

A release clip for a tube connector is thereby provided for use in a system with flowing fluid, which tube connector preferably has an opening through which the flowing fluid passes, which tube connector is arranged for secure and sealing connection with a tube which is inserted in the connector, where the interior of the connector has a conical portion along the circumference of the through-going opening, which portion has a tapering diameter in the direction towards the connector's opening, which connector is further provided with a sealing ring between the conical portion and the connector's opening, where at the conical portion of the connector there is mounted a circular gripper ring which grips the tube, which gripper ring has an outer conical surface substantially corresponding to the conical portion in the interior of the connector and which locking ring is split in its circular circumference with a section that permits the ring to change diameter when the ring moves in the connector's longitudinal direction along the internal conical portion.

It is preferable that the length of the release body in its longitudinal direction is at least equal to the distance extending from the housing's opening to the gripper ring.

The release clip according to the present invention is adapted to a type of tube connector where a tube is inserted in the connector, whereupon the tube pushes the gripper ring down along the internal conical portion in the connector towards the part of the conical portion that has a larger diameter. Since the gripper ring is split, it will be able to expand and the tube's outer diameter passes inside the gripper ring in the connector. When the tube is then inserted all the way in past the gripper ring, an attempt to pull the tube out again will result in the gripper ring traveling along the internal conical portion in the connector towards the part of the conical portion with a smaller diameter and the gripper ring (still because it is split) will be compressed and be tightened round the exterior of the tube. The gripper ring thereby grips the tube's exterior, retaining it in the connector.

In the preferred embodiment of the gripper ring for use with the release clip according to the present invention, the gripper ring is provided with a conical portion at its upper, inner circumference, round the tube. This ensures that the ring "catches" the release clip when it is pushed against the gripper ring, while at the same time the release clip will help to expand the gripper ring (since it is split), thereby making it easier for it to let go of the tube.

During use the release clip is mounted round the tube by the longitudinal split in the longitudinal direction being opened and the release device being "snapped" round the tube with the release body facing the connector. To release the tube, the release clip is clamped round the tube so that the release body tightly encloses the tube, whereupon the release clip is pushed towards the connector. The front end of the release body is pushed between the front seal in the connector and on along the tube to the gripper ring. There the release clip contacts the gripper ring and pushes it along the conical portion of the interior of the connector, whereupon the gripper ring, since it is split, will expand, releasing its grip around the exterior of the tube. The tube can then be withdrawn, after which the release clip can be withdrawn.

In different alternative embodiments of the connector the conical portion in the interior of the connector may be integrated in the connector or a part of a separate insert in the connector. The conical portion may be whole or segmented.

In different embodiments of the release clip it may have an external gripping surface. This is a preferred embodiment and will make it easier to activate the release clip. It is also preferred that the gripping surface has a flange protruding from the gripping surface substantially perpendicularly to the gripper body. This makes it easier to push the release clip into the connector by manual force and gives the operator a better grip with one hand.

The gripping surface and the flange furthermore may preferably have an indent or an opening along their circumference substantially in the area located opposite the release clip's longitudinal split. This makes it possible, despite the flange, to open the release clip sufficiently to enable it to be mounted round the tube by expanding the longitudinal split.

The gripping surface and the flange are preferably each formed in two distinct sections, each section respectively extending from adjacent the hinge around a part of the circumference of the release body to the split. The location of the flange and gripping surface is radially adjacent the release body of the clip and hence, in use, the force applied by the operator is an axial force directed either into or out of the tube connector element. This arrangement is a more mechanically efficient as the force required to insert the release clip into or out of the tube connector element is reduced. It shall be appreciated that the flange provides the means by which the insertion force applied by the operator is contiguous to the surface of the tube being extracted from the connector element.

Furthermore, the gripping surface and/or the flange may be made in a groove and tongue form for the whole or parts of the release clip's longitudinal split. This prevents the release clip, when clamped tightly round the tube, from overlapping or coming into a misaligned position.

The gripping surface preferably also has grooves or ridges that provide friction to give a better grip when the release clip is pushed down into the tube connector.

To provide a good grip for the operator, moreover, in an embodiment the flange may have a curved transition portion to the release body.

A release clip according to the preferred embodiment of the present invention will be easy to use since it is split in its longitudinal direction and has a "hinge" effect on the opposite side of the split, where, e.g. the indent in the flange prevents the flange from making the release clip rigid when it has to be mounted round the tube. This gives the release clip the flexibility required for mounting it round the tube. The flange with a friction-creating gripping surface and curved transition to the release body, moreover, will help to provide a good grip when the release clip has to be pushed along the tube into the connector.

Since the release clip is also preferably thin-walled at the release body's front edge, it will be able to avoid damaging, for example, the seal at the connector's opening since the release device easily passes on the inside thereof.

The flange should also preferably be relatively large to enable it to provide a good surface for inserting the release clip.

The release clip is preferably made of plastic since an equivalent metal clip could damage sealing rings between the tube connector's inlet and the gripper ring holding the tube, such as, for example, an environmental seal that prevents dirt and moisture from penetrating the connector.

Furthermore, it is preferred that the release body is thin-walled to enable it to pass seals between the tube and the housing in the tube connector, in addition to which the release body should be able to contact the gripper ring as close against the tube as possible.

The gripping surface is preferably formed in two distinct sections, each section respectively extending from adjacent the hinge and around a part of the circumference of the tubular body to the split.

Preferably, the flange is formed in two distinct sections, each section respectively extending from adjacent the hinge and around a part of the circumference of the tubular body to the split.

In an embodiment of the present invention one of the distinct sections of the flange is preferably formed with an end section that is adapted to be received by a cutout section formed in an end section of the other distinct section, the arrangement being such that, in use, the end section is received by the cutout as the two flange sections pivot about the hinge.

Preferably, the two respective opposing end sections of the two distinct sections are each formed with a respective end section protrusion that is adapted to be received by a respective cutout section the arrangement being such that, in use, the first end section is receivable by the first cutout as the two flange sections pivot about the hinge as the release clip is opened in order to be placed onto a tubular element and the second end section is receivable by the second cutout as the two flange sections pivot about the hinge as the release clip is closed around the tubular element.

The first cutout and end section protrusion are disposed adjacent the hinge of the release clip. When the clip is opened by pivoting the two sections about the hinge the first end section protrusion is moved towards the first cutout section and is received by the first cutout section. As a consequence of the first protrusion extending towards the first cutout section the user is prevented from placing the release clip incorrectly on the tubular element as the visible gap between the distinct sections of the flange is substantially reduced. In the opened position the first end section protrusion is received by the first cutout and overlaps a part of the flange such that arrangement provides a stabilising function to the clip.

The second cutout and end section protrusion are disposed adjacent the single split of the release clip. When the clip is closed around the tubular element by pivoting the two sections about the hinge and the release clip is inserted into the connector element the second end section protrusion is moved towards the second cutout section and is received by the second cutout section. As a consequence of the second protrusion being received by the second cutout section the clip is provided with a stopping and stabilizing arrangement.

Preferably, the clip comprises a pair of webs, a respective web being disposed either side of the hinge and the webs being usable for opening the split of the clip. The webs act as levers that extend in a longitudinal direction from the flange. As the webs are pressed together the clip pivots about the hinge so opening up the split.

The webs enable the clip to be more easily opened by a user and hence more easily mounted onto the tubular element. The webs provide a leverage means which aids the opening of the clip. The clip does not require an additional connecting piece, such as a handle, for placing the clip on the tubular element. The integral compact nature of the clip design has advantages when being used in a confined and restricted work space.

BRIEF DESCRIPTION OF THE DRAWINGS

Some preferred embodiments of a release clip according to the present invention are further illustrated in the attached figures, in which:

FIG. 7 is plan view of the release clip shown in FIGS. 4, 5 and 6.

FIGS. 1 and 2 illustrate a release clip according to a preferred embodiment of the invention. The release clip 1 has a release body 2 which is thin-walled and with a length as indicated in the above description and claims, i.e. at least as long as the distance from the connector's opening to the gripper ring (illustrated in FIG. 3).

Figure 1:
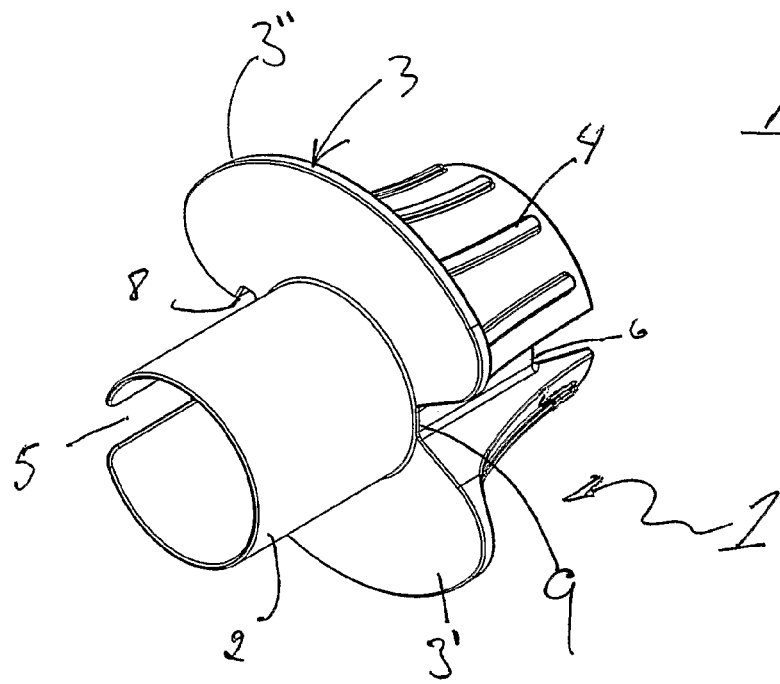
FIGS. 1 and 2 illustrate a release clip according to the present invention in perspective from two sides.

Furthermore, the release clip has a split 5 in its longitudinal direction, where a groove and tongue form 7, 8 is created to prevent the two sides of the clip from overlapping, particularly in the thin-walled area.

The release clip 1 also has a flange 3 with a curved transition on the top of the release body, and the flange 3 and the release clip 1 are further provided with a gripping surface with raised portions 4 that create friction to give a better grip when using the release clip 1. The flange 3 also has an indent 9 as well as a cutout 6 on the opposite side of the longitudinal split 5 in order to create a hinge effect, thus enabling the release clip 1 to be opened in order to be mounted round a tube that has to be released. The flange 3 forms two distinct sections 3' and 3".

Figure 3:
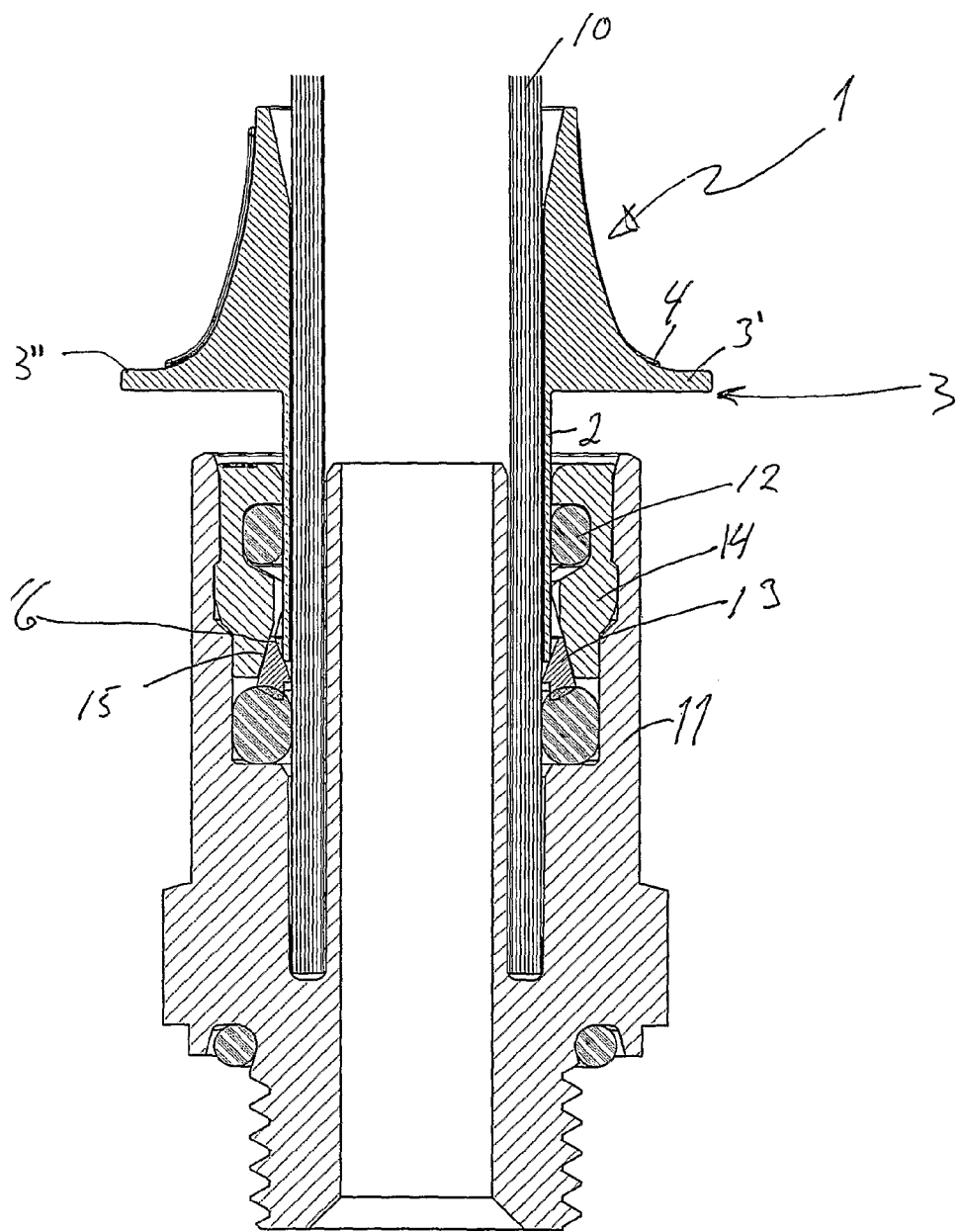
FIG. 3 illustrates the release clip in FIGS. 1 and 2 in cross section, when it is pushed into a connector with a tube for releasing the tube.
Figure 4:
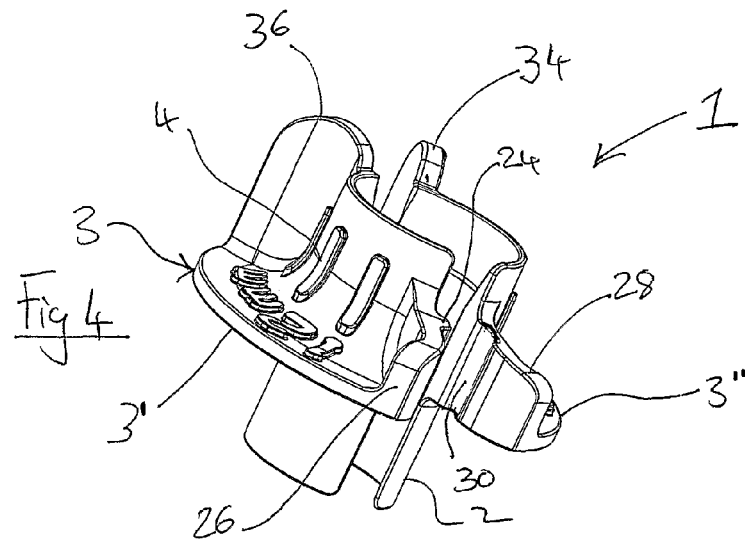
FIG. 4 shows a further embodiment of the present invention and is an isometric top view of a release clip.
Figure 5:
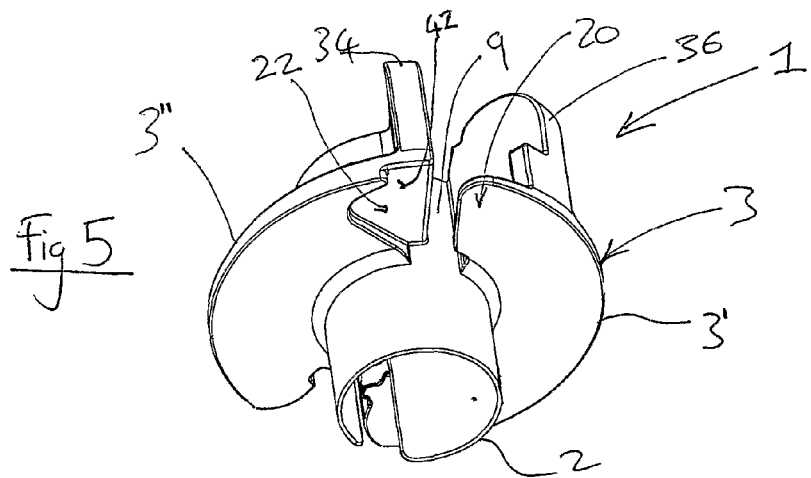
FIG. 5 is an isometric bottom view of the release clip shown in FIG. 4.
Figure 6:
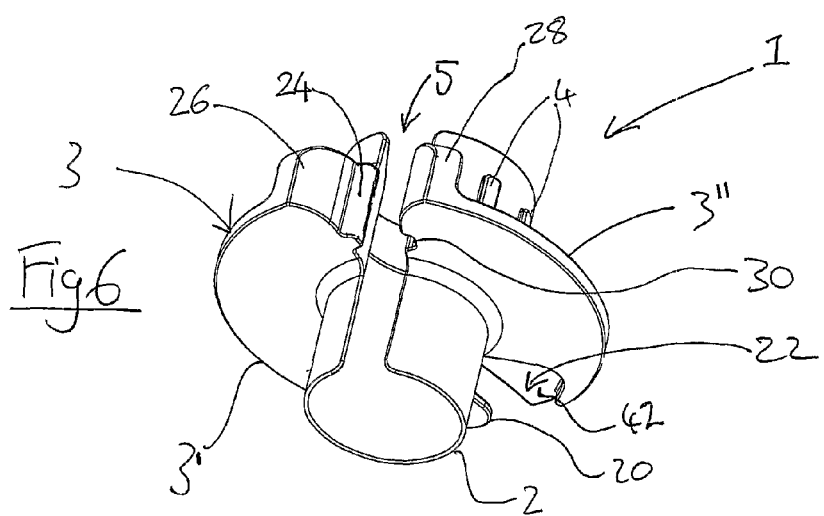
FIG. 6 is a second isometric bottom view of the release clip shown in FIG. 4.

Furthermore, in FIG. 3 a release clip 1 according to the present invention is illustrated where the clip 1 is pushed into a tube connector 11 with a tube 10. As illustrated in the figure, the tube connector 11 has a sealing ring 12 near the connector's 11 opening and an internal conical portion 15 with a locking ring 13. The locking ring is split, thereby enabling it to move in the connector's (and the tube's) longitudinal direction along the conical portion 15. In the figure the conical portion is shown on an insert 14 in the tube connector 1. This is an alternative in the connector and the present invention is independent of this since the conical portion 15 may be on an insert in the connector body or be integrated in the connector body as a part thereof.

Figure 2:
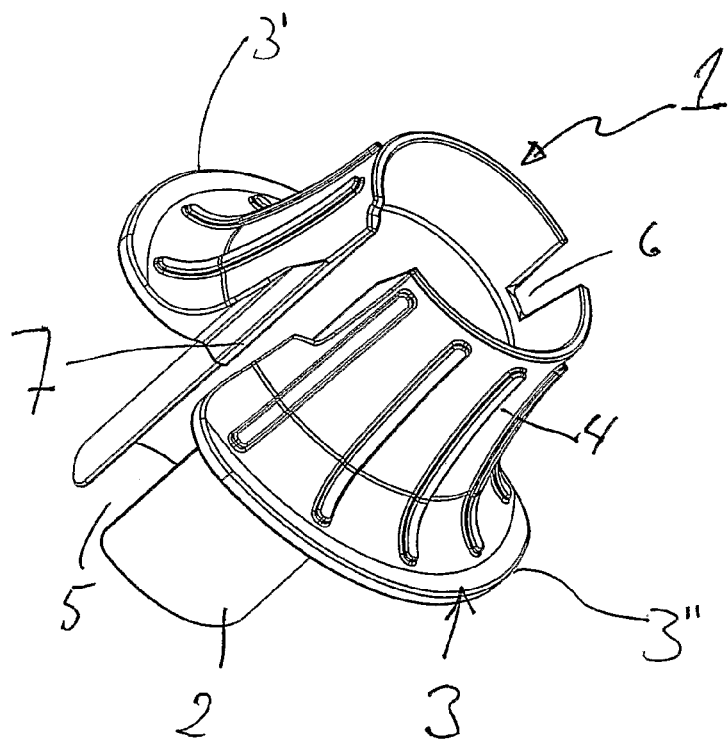

In FIG. 3 a release clip 1 is illustrated with a release body 2 which is thin-walled. The release clip 1 is mounted round the tube 10 by the longitudinal split 5 in FIGS. 1 and 2 being expanded and pushed into the tube 10. The release body 2 is pushed down in the tube connector, past the upper sealing ring 12 and down to abut against the gripper ring 13. As depicted in the figure, the gripper ring 13 preferably has a conical surface 16 along its inner circumference. The release clip's release body 2 contacts this conical surface 16, subsequently pushing the gripper ring down in the connector. Since the gripper ring is split, when it moves along the conical portion 15 in the tube connector, it will expand. In addition, the release body 2 pushes the gripper ring out so that it expands by means of the movement of the release body 2 along the inner conical surface 16 in the gripper ring.

When the release clip has pushed the gripper ring 13 down and it has expanded, it will release its grip round the tube 10, enabling it to be withdrawn. The release clip can then also be withdrawn and the tube is released from the tube connector.

FIGS. 4 to 7 show a further embodiment of the present invention and show a release clip as described above and including some additional features.

With reference to the FIGS. 4 to 7, one of the distinct sections 3' of the flange 3 is formed with an end section protrusion 20 that is adapted to be received by a cutout section 22 formed in an end section of the other distinct section 3", the arrangement being such that, in use, the end section protrusion 20 is received by the cutout 22 as the two flange sections 3' and 3" are pivoted about the hinge 9. The other end of the distinct section 3' is formed with a raised nib 24 disposed on a wall section 26. The wall section 26 extends substantially radially outwardly from the edge of the flange section 3'. The nib 24 extends substantially longitudinally along the wall section 26. The section 3" of the flange 3 is formed with a corresponding wall section 28 formed with a channel 30. The channel 30 is adapted to receive the nib 24 as the clip 1 is closed around a tubular element and the clip 1 is inserted into the tube connector 11.

As the clip 1 is opened by pivoting the two sections 3' and 3" about the hinge 9 the end section protrusion 20 is received by the cutout 22. As a consequence of the end section protrusion 20 extending towards the cutout 22 the user is prevented from placing the release clip 1 incorrectly on the tubular element because the visible gap 32 between the distinct sections 3' and 3" of the flange 3 is substantially reduced. A consequence of the end section protrusion 20 being received by the cutout 22 is that the stability of the clip 1 is increased. The upper surface 21 of the end section protrusion 20 may be in sliding contact with the lower surface 42 of the cutout section 22 as the clip 1 is pivoted about the hinge 9. The shape of the protrusion 20 is adapted to correspond to the shape of the cutout 22. As a consequence of protrusion 20 being receivable by the cutout 22 the clip 1 is provided with a stopping and stabilising arrangement.

When the clip 1 is closed around the tubular element 10 by pivoting the two sections 3' and 3" about the hinge 9 and the release clip 1 is inserted into the connector 11 the nib 24 is moved towards the channel 30 and is received thereby. As a consequence of the nib 24 being received by the channel 30 the clip 1 is provided with a stopping and stabilising arrangement.

The clip 1 also comprises a pair of webs 34, 36 disposed either side of the hinge 9. The webs are used for aiding the opening the split 5 of the clip 1. The webs 34, 36 act as levers that extend in a longitudinal direction from the flange 3. As the webs 34, 36 are pressed towards each other in direction 40 the split 5 is opened. When the webs 34, 36 are released the webs 34, 36 automatically more in a direction opposite to direction 40 and the size of the split 5 is reduced.

The invention claimed is:

1. A release clip comprising:
    a release body formed with a split extending along a longitudinal axis of the release body and having an integral hinge formed by a region of the release body;
    a flange formed on top of the release body circumferentially around the release body, the flange extending radially outside the integral hinge of the release body; and
    a pair of webs extending longitudinally from the flange, the pair of webs usable for opening the split of the release body by pressing together the webs, the pair of webs being disposed on either side of the hinge without directly contacting each other prior to opening the split, and each web extending radially outside the integral hinge without extending radially outside the circumference of the flange, wherein the release clip is snap mountable onto a tube and demountable from the tube by pressing together the webs, thereby opening the split, and wherein the release clip has an external gripping surface, the gripping surface has the flange protruding from the gripping surface substantially perpendicularly to the gripping surface, and the gripping surface and the flange have an indent or an opening along their circumference substantially in the area located opposite the longitudinal split of the release body.

2. A release clip according to claim 1, wherein the integral hinge is at least partly formed by a region of reduced wall thickness of the release body.

3. A release clip according to claim 1, wherein the integral hinge is at least partly formed by a cutout region in the release body.

4. A release clip according to claim 1, wherein the integral hinge is disposed substantially opposite the split.

5. A release clip according to claim 1, wherein at least one of the gripping surface and the flange are made with a groove and tongue forming at least part of the longitudinal split.

6. A release clip according to claim 1, wherein the gripping surface has grooves or ridges for providing a frictional grip when the release clip is pushed down into the connector element.

7. A release clip according to claim 1, wherein the flange has a curved transition portion to the release body.

8. A release clip according to claim 1, wherein the release clip is made of plastic material.

9. A release clip according to claim 1, wherein the flange is formed in two distinct sections, each section respectively extending from adjacent the hinge, around a part of the circumference of the release body to the split.

10. A release clip, comprising:
a release body formed with a split extending along a longitudinal axis of the release body and having an integral hinge formed by a region of the release body;
a flange formed on top of the release body circumferentially around the release body, the flange extending radially outside the integral hinge of the release body; and
a pair of webs extending longitudinally from the flange, the pair of webs usable for opening the split of the release body by pressing together the webs, the pair of webs being disposed on either side of the hinge without directly contacting each other prior to opening the split, and each web extending radially outside the integral hinge without extending radially outside the circumference of the flange, wherein the release clip is snap mountable onto a tube and demountable from the tube by pressing together the webs, thereby opening the split, and wherein the release clip has an external gripping surface, and the gripping surface is formed in two distinct sections, each section respectively extending from adjacent the hinge, around a part of the circumference of the release body to the split.

11. A release clip, comprising:
a release body formed with a split extending along a longitudinal axis of the release body and having an integral hinge formed by a region of the release body;
a flange formed on top of the release body circumferentially around the release body, the flange extending radially outside the integral hinge of the release body; and
a pair of webs extending longitudinally from the flange, the pair of webs usable for opening the split of the release body by pressing together the webs, the pair of webs being disposed on either side of the hinge without directly contacting each other prior to opening the split, and each web extending radially outside the integral hinge without extending radially outside the circumference of the flange, wherein the release clip is snap mountable onto a tube and demountable from the tube by pressing together the webs, thereby opening the split, and wherein the release clip has an external gripping surface, the gripping surface has the flange protruding from the gripping surface substantially perpendicularly to the gripping surface, the flange is formed in two distinct sections, each section respectively extending from adjacent the hinge, around a part of the circumference of the release body to the split, and one of the distinct sections of the flange is formed with an end section that is adapted to be received by a cutout section formed in an end section of the other distinct section.

12. A release clip according to claim 11, wherein the end sections of the two distinct sections are each formed with a respective end section protrusion that is adapted to be received by a respective cutout section, the arrangement being such that, in use, one of the end sections is receivable by the first cutout as the two flange sections pivot about the hinge as the release clip is opened in order to be placed onto a tubular element and the other of the end sections is receivable by the second cutout as the two flange sections pivot about the hinge as the release clip is closed around the tubular element.

* * * * *